April 8, 1924.  
E. M. BALLOT  
1,489,732  
CAM FOR CONTROLLING THE FRONT WHEEL BRAKES OF MOTOR VEHICLES  
Filed July 11, 1923

INVENTOR.  
E. M. Ballot.  
By William C. Linton  
Atty.

Patented Apr. 8, 1924.

1,489,732

UNITED STATES PATENT OFFICE.

ERNEST MAURICE BALLOT, OF PARIS, FRANCE.

CAM FOR CONTROLLING THE FRONT-WHEEL BRAKES OF MOTOR VEHICLES.

Application filed July 11, 1923. Serial No. 650,936.

*To all whom it may concern:*

Be it known that I, ERNEST MAURICE BALLOT, residing in Paris, France, have invented new and useful Improvements in Cams for Controlling the Front-Wheel Brakes of Motor Vehicles, of which the following is a specification.

This invention relates to a cam having a special shape and chiefly applicable to the control of segments of front wheel brakes of motor vehicles, since it can be used even in any state of wear to steer the wheels without causing an untimely braking or the jamming of the cam in its sleeve, the action being performed without appreciable play.

For this purpose the cam according to the invention is preferably cut out of a cube or a parallelopiped whereof the top and bottom are suitably shaped so as to form in each case a very flat cone, and the two lateral operative faces are cut partially by a cylinder of revolution of the cam, and partially by a cone of revolution.

The geometrical axis of the cylinder coincides with the pivoting axis of the wheel in the non-braking position before wear takes place, whilst the axis of the cone has a position such that it coincides with the pivoting axis of the wheel when the brake segments have become worn to some extent.

By reason of the special shape thus obtained the cam secured to the vehicle frame can assume a pivoting motion in relation to the sleeve of internal square section secured to the wheels and controlling the brake, but without rotating the said sleeve, the latter however remaining in contact with the cam upon its four faces, since the play is quite negligible. In order to ascertain the effect of the wear of the segments, the said sleeve can be turned upon its axis by a suitable adjustment so that the stroke of the driver's lever or pedal shall be the same in all cases for a given action of the brake.

The appended drawings which are given by way of example set forth the said invention.

The following description relates to the construction of the cam 1, this being secured to the vehicle frame, whilst the sleeve 4 actuated by the cam and having a square hole, is secured to the vehicle wheels. In this arrangement it is necessary that these two members should be enabled to pivot upon one another about the axis CD irrespectively of the relative position of the latter.

For this purpose the cam 1 is cut out of a cube whose upper part is intersected by two flattened cones formed by the rotation of the upper internal face of the sleeve 4 about the pivoting axis, the lateral internal faces of said sleeve being in the case of one of the cones, parallel with CD, and for the other cone suitably inclined (at 15 degrees) to this axis. The bottom of said cube is cut in an analogous manner by the lower face of the sleeve whilst its lateral operative faces are cut by a cylinder and a cone corresponding to the two cases above mentioned and forming surfaces generated by the rotation of the lateral internal faces of said sleeve about the axis CD.

Figure 1:
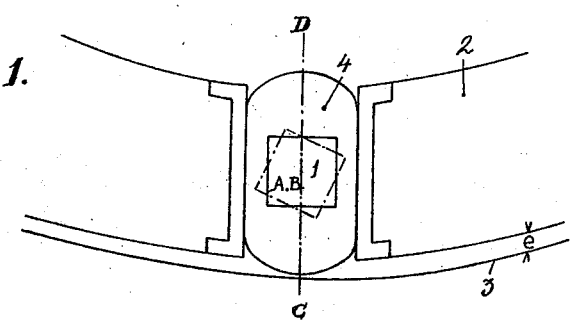
Fig. 1 is an end view of the square sleeve disposed between the ends of two brake segments.
Figure 2:
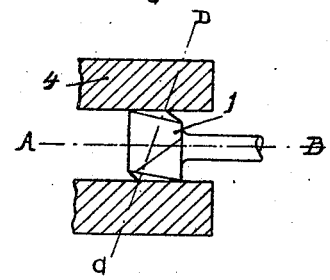
Fig. 2 is a lengthwise section of the said sleeve and the cam.
Figure 3:
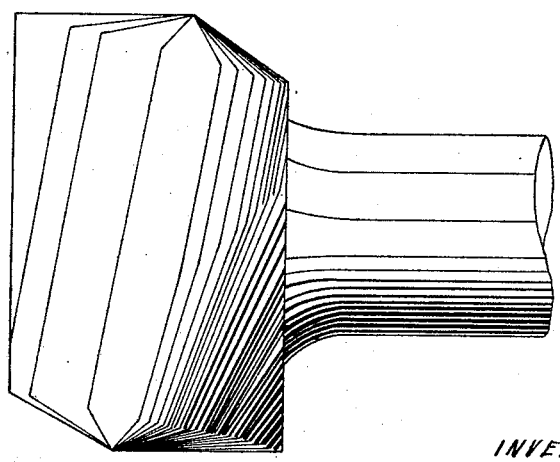
Fig. 3 is an elevational view of the cam.

The position of the said sleeve in which the cylinder is formed is shewn in the full lines in Fig. 1 whilst the position corresponding to the cone is shewn in the dotted lines. In these two positions, the object is to maintain a constant spacing $e$ between the brake segments 2 and the internal wall 3 co-operating therewith, irrespectively of the wear of these parts and by an adjustment which is made with facility.

In spite of this inclination which is variable for the above-mentioned reason, the said sleeve is enabled to pivot with respect to the cam since by reason of the shape of said cam the contact between these two members only takes place according to a generatrix of the surfaces formed around CD. It is obvious on the other hand that the rotation of the cam about AB will actuate the said sleeve and thus control the brake.

In the preceding description, the cam has been considered as occupying only two positions, one corresponding to the segments when new and the other to a given amount of wear of the same. But it is quite feasible to provide for various intermediate positions, and in this case the lateral faces of the cam will comprise not only the cylinder portion but also various faces formed by portions of cones. One may even use the limiting surface constituting the envelope of these cones, and in this event the top and bottom of the cam are formed by a spherical cap which is a portion of the envelope of the planes which are displaced at a given constant distance from the point of intersection of the pivoting axis CD and the axis AB.

Obviously, the use of the said cam is not limited to the case of the control of the front brakes of motor vehicles, and this use, which appears to be the principal one, is given solely by way of example.

I claim:

A cam for controlling the segments of front wheel brakes or analogous elements, mounted in a sleeve having four operative internal faces and whereof the external part actuates the controlled segments, the said cam being characterized by the special shape of its active surface which comprises portions of cones and of cylinders of revolution having as geometrical axes the pivoting axis of the wheel considered in its various relative positions, said cones and cylinders being the envelopes of the operative internal faces of the sleeve, in the pivoting motion, the said envelopes being obtained for different angular positions of the sleeve.

In witness whereof I affix my signature.

ERNEST MAURICE BALLOT.